(12) United States Patent
Diggle, III et al.

(10) Patent No.: US 6,978,972 B1
(45) Date of Patent: Dec. 27, 2005

(54) SUPPORT SYSTEMS AND ASSOCIATED WIRE CARRIERS USING COIL SPRINGS IN ASSOCIATION WITH SUPPORTED OBJECTS

(75) Inventors: Frederick James Diggle, III, Birmingham, AL (US); Daniel R. Cheshire, Trafford, AL (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 244 days.

(21) Appl. No.: 10/646,160

(22) Filed: Aug. 22, 2003

(51) Int. Cl.⁷ ................................................. F16L 3/00
(52) U.S. Cl. ........................................... 248/58; 24/549
(58) Field of Search .............................. 248/58, 62, 63, 248/67.7, 69, 317, 60, 74.2, 74.3, 231.81, 248/229.16, 229.26, 228.7, 230.7, 316.7; 224/674, 675, 251

(56) References Cited

U.S. PATENT DOCUMENTS

| | | | |
|---|---|---|---|
| 753,611 A * | 3/1904 | McGill ........................ 248/302 |
| 754,285 A * | 3/1904 | Dick ........................... 248/302 |
| 800,050 A | 9/1905 | Ayres | |
| 965,707 A * | 7/1910 | Hammond ............... 248/316.7 |
| 1,479,150 A | 1/1924 | Mellus | |
| 2,433,314 A * | 12/1947 | White ................... 248/231.51 |
| 2,440,469 A | 4/1948 | Goddard | |
| 2,543,313 A * | 2/1951 | Dietzgen .................... 224/240 |
| 2,557,532 A * | 6/1951 | Chaft .................... 248/229.16 |
| 3,144,695 A | 8/1964 | Budwig | |
| 3,289,983 A | 12/1966 | Mennerdahl | |
| 3,791,663 A | 2/1974 | Allsop et al. | |
| 4,318,525 A * | 3/1982 | Welch ...................... 248/228.7 |
| 4,441,233 A | 4/1984 | Swift | |
| 4,765,037 A | 8/1988 | Perry | |
| D310,716 S | 9/1990 | Trask | |
| 4,990,157 A | 2/1991 | Roberts et al. | |
| 5,042,113 A | 8/1991 | Severson et al. | |
| 5,150,504 A | 9/1992 | Cohen | |
| 5,772,090 A * | 6/1998 | Rodriguez ................... 224/251 |
| 6,073,315 A | 6/2000 | Rasmussen | |
| 2004/0069824 A1 * | 4/2004 | Condiff ....................... 224/269 |

OTHER PUBLICATIONS

U.S. Appl. No. 10/645,950, filed Aug. 22, 2003.
U.S. Appl. No. 10/648,889, filed Aug. 27, 2003.
U.S. Appl. No. 10/648,890, filed Aug. 27, 2003.
Carrier Handline B 0A07710, Apparatus Equipment and Tools, BellSouth Products Catalog, Jan. 2003, p. 141.

* cited by examiner

Primary Examiner—Ramon O Ramirez
(74) Attorney, Agent, or Firm—Potomac Patent Group PLLC

(57) ABSTRACT

In one embodiment, a wire carrier structured to support at least a portion of at least one supported object is provided. The wire carrier includes an elongated bar having a thickness and having at least one coil spring portion formed therein having a diameter; a first arm having a proximate end connected to a first portion of the coil spring portion and a distal end; a second arm having a proximate end connected to a second portion of the coil spring portion and a distal end structured for contact with the distal end of the first arm; and, the coil spring portion being structured to resiliently bias the distal end of the first arm in contact with the distal end of the second arm for assisting with support of the supported object. Support system embodiments using various wire carrier embodiments are also provided.

7 Claims, 5 Drawing Sheets

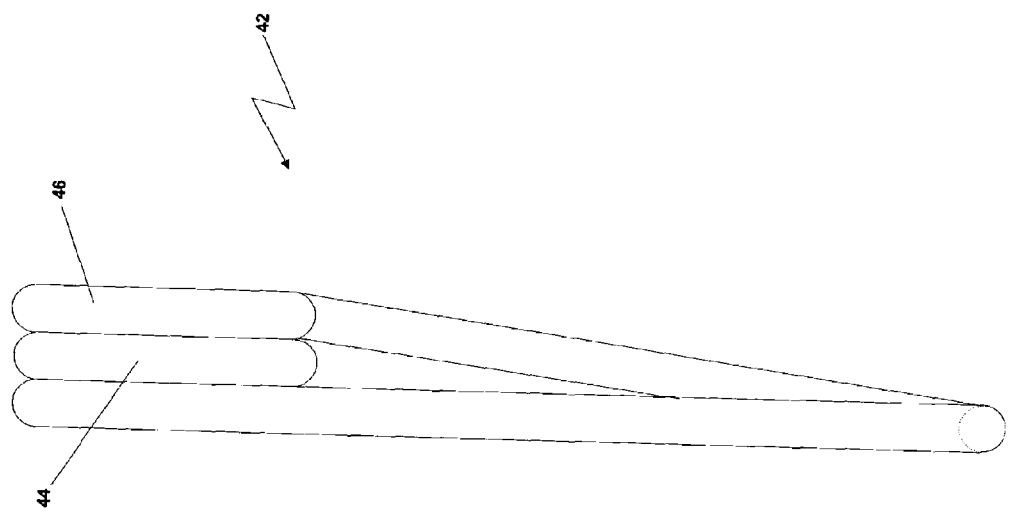

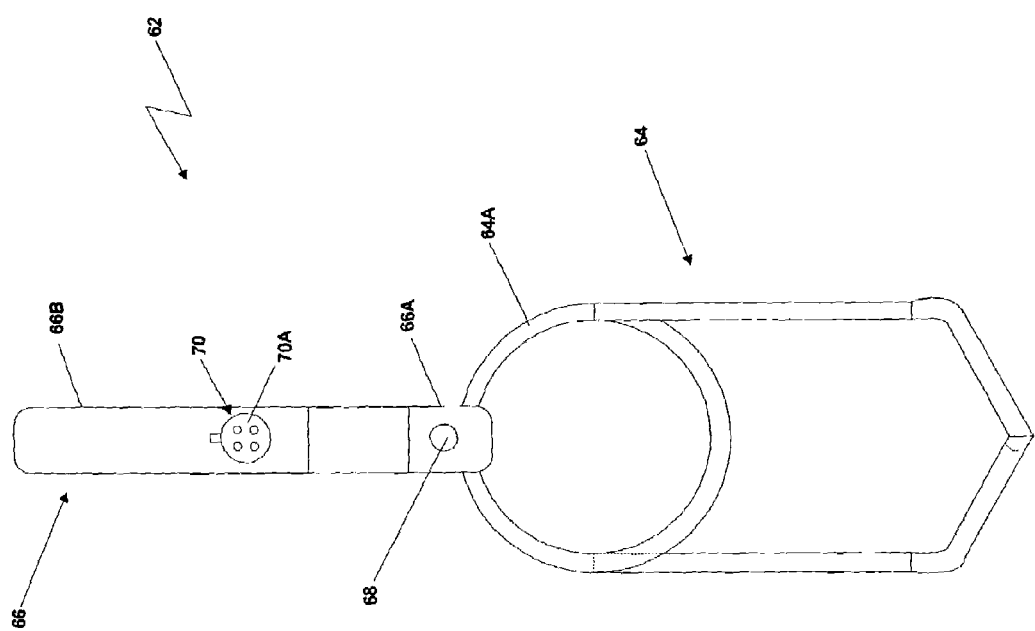

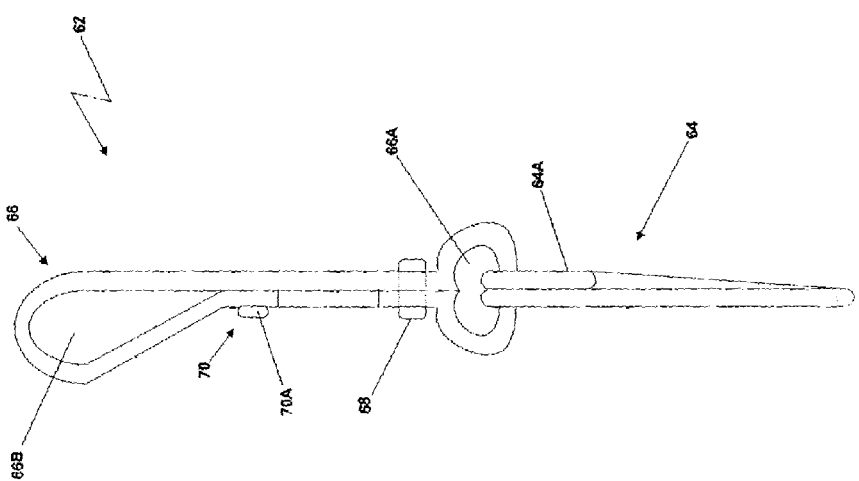

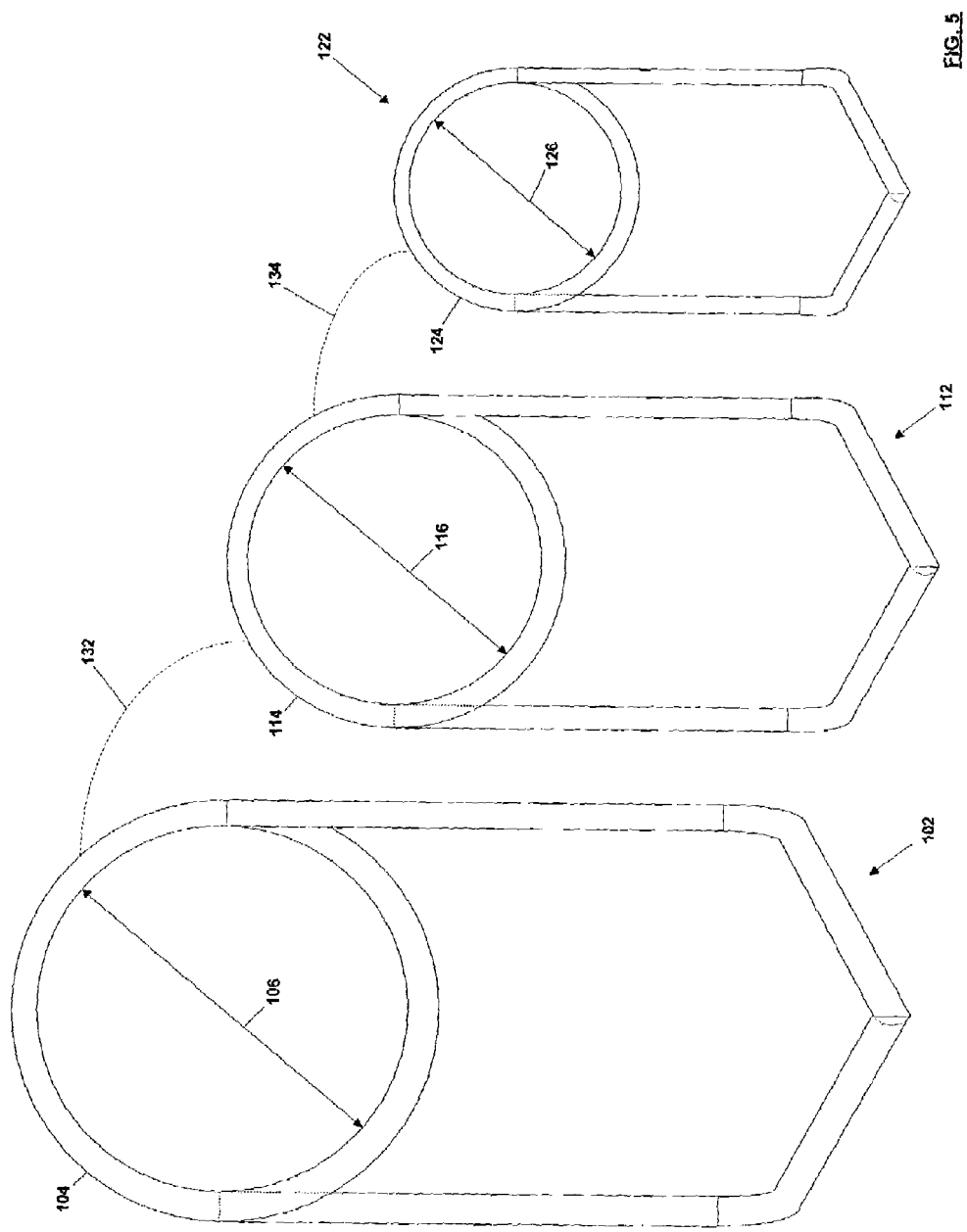

SUPPORT SYSTEMS AND ASSOCIATED WIRE CARRIERS USING COIL SPRINGS IN ASSOCIATION WITH SUPPORTED OBJECTS

BACKGROUND

In many commercial and industrial settings, work sites at which work is performed may be associated with utility structures or other elevated structures. Scaling such elevated structures is often required by workers performing maintenance, installation and/or other related functions on equipment located at such elevated work sites. In elevated work environments, it may be difficult for workers to manipulate work tools and perform work on equipment at the work site, while also maintaining a reasonably stable physical position on a utility pole, for example, or another elevated structure associated with the work site.

It can be appreciated that commercial entities and other organizations that employ workers in elevated environments are aware of the potential risks attendant upon work performed in such environments. In view of this awareness, commercial entities and other organizations devote time and resources to promoting the safety of workers performing work in elevated environments to make the performance of work as safe as possible. Promoting safety of workers in elevated environments may involve instituting intensive training programs and/or providing workers with a variety of support devices, support systems, backup devices and systems, and/or other means that promote the stability and safety of workers in elevated environments. Despite the best efforts of an organization to enhance the safety of its workers and reduce the risks presented by tools, work materials, or other objects potentially descending from elevated structures, for example, it is nonetheless difficult to eliminate all risks to workers performing work on such elevated structures.

Many conventional line or wire carriers, for example, do not successfully balance the need for a worker to ascend an elevated structure to perform work with a certain amount/weight of a supported object such as an amount/weight of wire, for example, against the need to promote safety of the worker using the supported object in association with the work performed. What are needed, therefore, are apparatus and systems for promoting safe and effective work functions for workers using supported objects such as wire, for example, on elevated utility structures. Such apparatus and systems may be beneficial in addition to the myriad existing support systems, methods, devices and/or other apparatus employed by workers on elevated structures to reduce or mitigate risks associated with objects potentially descending from utility structures, for example.

SUMMARY

In one embodiment of the present embodiments, a wire carrier structured to support at least a portion of at least one supported object is provided. The wire carrier includes an elongated bar having a thickness and having at least one coil spring portion formed therein having a diameter; a first arm having a proximate end connected to a first portion of the coil spring portion and a distal end; a second arm having a proximate end connected to a second portion of the coil spring portion and a distal end structured for contact with the distal end of the first arm; and, the coil spring portion being structured to resiliently bias the distal end of the first arm in contact with the distal end of the second arm for assisting with support of the supported object.

In another embodiment of the present embodiments, a support system is provided including a wire carrier structured to support at least a portion of at least one supported object. The support system includes a wire carrier including an elongated bar having a thickness having at least one coil spring portion formed therein having a diameter, a first arm having a proximate end connected to a first portion of the coil spring portion and a distal end, a second arm having a proximate end connected to a second portion of the coil spring portion and a distal end structured for contact with the distal end of the first arm, the coil spring portion being structured to resiliently bias the distal end of the first arm in contact with the distal end of the second arm for assisting with support of the supported object; and, a strap having an enclosure portion operatively associated with at least a portion of the coil spring portion of the wire carrier.

In another embodiment of the present embodiments, a wire carrier structured to support at least one portion of at least one supported object is provided. The wire carrier includes an elongated bar having a thickness having at least one coil spring portion formed therein having a diameter; a first arm having a proximate end connected to a first portion of the coil spring portion and a distal end; a second arm having a proximate end connected to a second portion of the coil spring portion and a distal end structured for contact with the distal end of the first arm; the coil spring portion being structured to resiliently bias the distal end of the first arm in contact with the distal end of the second arm for assisting with support of the supported object; at least one of the distal end of the first arm and the distal end of the second arm includes a convex mating surface formed on at least a portion thereof; and, at least one of the distal end of the first arm and the distal end of the second arm includes a concave mating surface formed in at least a portion thereof.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE FIGURES

FIG. 2 includes a side view of one example embodiment of a wire carrier provided in accordance with various aspects of the present embodiments;

FIG. 3 includes a front view of one example embodiment of a support system provided in accordance with various aspects of the present embodiments;

FIG. 4 includes a side view of one example embodiment of a support system provided in accordance with various aspects of the present embodiments; and, FIG. 5 includes one example embodiment of a group of commonly operatively associated wire carriers provided in accordance with various aspects of the present embodiments.

DESCRIPTION

Figure 1:
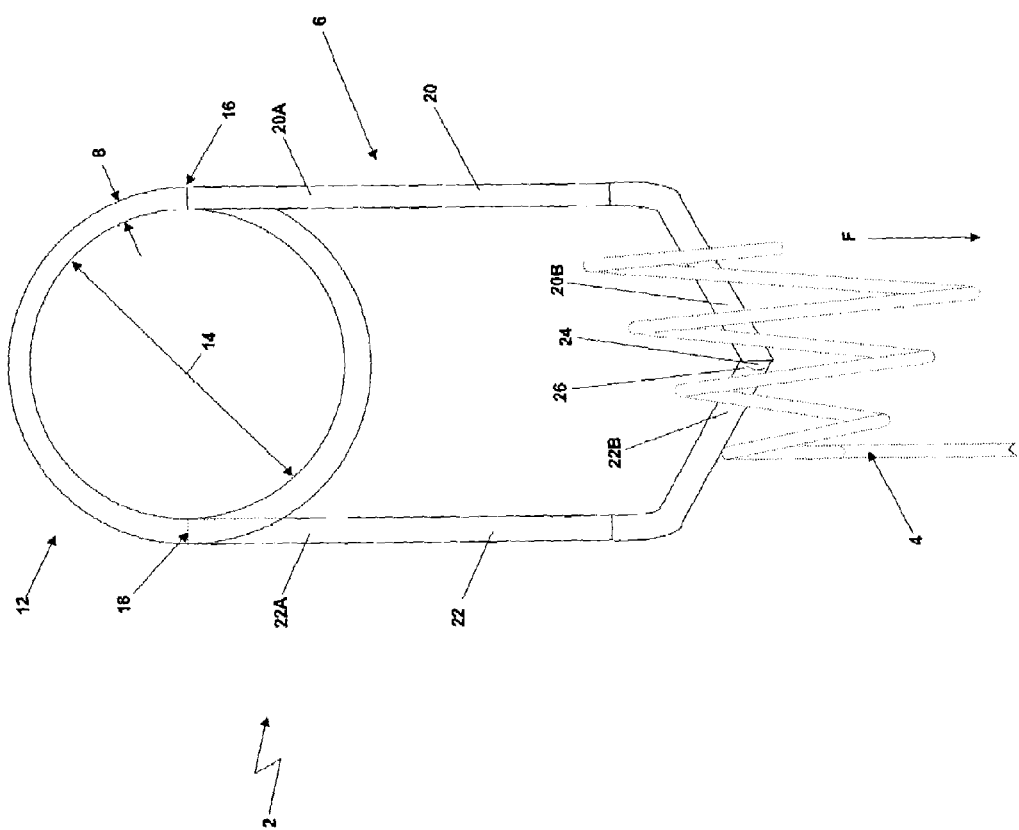
FIG. 1 includes a front view of one example embodiment of a wire carrier provided in accordance with various aspects of the present embodiments.

As used herein, the term "utility structure" includes, for example and without limitation, telephone poles and other structures supporting utility related equipment and services such as, for example, telephone services, Internet services, electricity services and/or television/cable services; scaffolding; radio towers; oil rigs; buildings; construction sites for buildings and other related erections; structures that require elevation of a worker; and/or any other structures suitable for use in association with one or more of the various embodiments discussed herein.

As used herein, the term "wire" includes, for example and without limitation, and where applicable and suitable for use with one or more of the various embodiments disclosed herein, metal wire (e.g., copper wire), telephone line, fiber optic cable, telecommunications cable, electrical transmission/distribution lines, lines for promoting support of elevated structures, guide wires, and/or any other type of wire suitable for application to one or more of the present embodiments.

As used herein, the term "supported object" includes any object or combination of objects capable of being supported by the various embodiments disclosed herein. One example of a supported object includes, for example and without limitation, an amount or quantity of wire, such as a length of wire, for example.

Referring now to FIG. 1, in one embodiment of the present embodiments, a wire carrier 2 is provided that is structured and configured for supporting at least a portion of one or more supported objects, such as supported object 4, for example (shown schematically in dotted-line format in FIG. 1). In one aspect, the wire carrier 2 includes an elongated bar 6 having a thickness 8. In various embodiments, the elongated bar 6 can be comprised of a material such as, for example and without limitation, one of the following materials or a combination of two or more of the following materials: a metal such as steel, spring steel, iron, aluminum; rubber; PVC plastic; and/or any material suitable for formation, configuration and/or structural manipulation of the elongated bar 6 in accordance with the various embodiments discussed herein.

In another aspect, a coil spring portion 12 having a diameter 14 is formed in the elongated bar 6. For purposes of the various illustrative embodiments discussed herein and for convenience of disclosure, the coil spring portion 12 can be defined, as shown in FIG. 1, as that portion of the elongated bar 6 extending from a first approximate location 16 to a second approximate location 18. While a generally circular configuration is formed by the example coil spring portion 12 as shown in FIG. 1, it can be appreciated that other shapes and configurations are possible, where suitable, for application to various aspects of the present embodiments such as, for example and without limitation, generally elliptical configurations, generally square configurations, generally rectangular configurations, generally triangular configurations, and/or other shapes/configurations suitable for providing a coil spring portion in accordance with the present embodiments.

In various of the present embodiments, the coil spring portion 12 is operatively associated with a first arm 20 having a proximate end 20A connected to a first portion of the coil spring portion 12 and a distal end 20B. In another aspect, the coil spring portion 12 is further operatively associated with a second arm 22 having a proximate end 22A connected to a portion of the coil spring portion 12 and a distal end 22B structured for contact with the distal end 20B of the first arm 20. It can be seen that the coil spring portion 12, in various embodiments, can structured and/or configured for resiliently biasing the distal end 20B of the first arm 20 in contact with the distal end 22B of the second arm 22 for assisting with support of at least a portion of the supported object 4.

It can be appreciated that factors such as the following, for example and without limitation, alone or in combination: amount, quantity, weight and/or another characteristic of the supported object 4; the diameter 14 of the coil spring portion 12; and/or the thickness 8 of the elongated bar 6, may be considered, among other factors, in determining the amount of force generated by the resilient bias of the first arm 20 in contact with the second arm 22. It can be further appreciated that the supported object 4, in one example aspect, can be provided as a length of wire, for example, used in connection with an elevated structure such as a utility structure, for example, can have a weight that varies in direct relationship with a height of the utility structure. In operational use by a service technician, for example, wire carried and extended from a surface elevation to a work site elevation on the utility structure possesses weight that is a function of the height of the utility structure. It can be appreciated that the weight of the supported object 4 exerts a force such as force F, for example, with respect to various portions of the wire carrier 2.

It can be seen that various embodiments of the wire carrier can be configured/structured to account for the force F exerted by the weight of the supported object 4, for example, to promote the safety of a service technician, for example, carrying the supported object 4, while allowing an effective quantity of the supported object 4 to be carried by the service technician for performing desired work functions. In one example aspect, by providing for the arms 20,22 to move to an open position against the force of the resilient bias as a consequence of exertion of a predetermined level of force (such as through a predetermined configuration/structure of the wire carrier 2), thereby releasing the supported object 4 from the wire carrier 2, the safety or stability of a service technician may be promoted in the event that the supported object 4 is unexpectedly affected with an undesired or excessive level of force. In another example aspect, by providing for the arms 20,22 to remain in a resiliently biased closed position within an acceptable range of exertion of force (through predetermined configuration/structure of the wire carrier 2), support of the supported object 4 by the wire carrier 2 can be retained. It can be seen that retention of the supported object 4, despite exertion of an acceptable range of force up to a predetermined level of force, may reduce the possibility of unintentional or premature occurrences of releasing the supported object 4, for example. It can be seen that this retention of the supported object 4 may improve the efficiency and/or effectiveness of a service technician, for example, using the supported object 4 for work related functions on an elevated structure.

In other aspects of the present embodiments, at least one of the distal end 20B of the first arm 20 and the distal end 22B of the second arm includes a convex mating surface, such as convex mating surface 24, for example, on at least a portion of one of the arms 20,22. In other aspects of the present embodiments, at least one of the distal end 20B of the first arm 20 and the distal end 22B of the second arm includes a concave mating surface, such as concave mating surface 26, for example, on at least a portion of one of the arms 20,22. In one operational aspect, when force of the resilient bias brings the arms 20,22 into contact, the convex mating surface 24 can be received, at least partially, into the concave mating surface 26 to promote contact between the arms 20,22 and to promote support and retention of the supported object 4 in the wire carrier 2.

Referring now to FIG. 2, in another embodiment of the present embodiments, a wire carrier 42 is shown having an additional coil spring portion 44 (i.e., in addition to a first coil spring portion 46). It can be appreciated that any suitable number of additional coil spring portions can be operatively associated with the first coil spring portion 46 in accordance with the present embodiments. It can be further appreciated that the additional coil spring portion 44 enhances the capacity of the wire carrier 42 for carrying a comparatively greater quantity and/or a comparatively greater weight of a supported object or objects such as an amount/length of wire, for example.

Referring now to FIGS. 3 and 4, a support system 62 is provided including a wire carrier 64 structured/configured for use to support at least a portion of at least one supported object (not shown). It can be appreciated that various aspects of the wire carrier 64 can be structured/configured in accordance with one or more aspects of the various wire carrier embodiments described hereinabove. For purposes of convenience and clarity of disclosure, discussion of various like elements of previously discussed wire carrier embodiments may or may not be repeated in the present discussion. In one aspect, the support system 62 further includes a strap 66 having an enclosure portion 66A structured for operative association with the wire carrier 64 to hold at least a portion of a coil spring portion 64A of the wire carrier 64. In various embodiments, the strap 66 can be comprised of a material such as, for example and without limitation, leather, metal, PVC plastic, and/or another material or combination of materials suitable for use in accordance with the present embodiments. In one aspect, the enclosure portion 66A of the strap 66 can be secured in operative position with the coil spring portion 64A of the wire carrier 64 by a conventional fastening means such as a rivet 68, for example, as shown.

In other aspects of the present embodiments, a connection portion 66B of the strap 66 can be provided to promote connection of the support system 62 to another object or structure such as, for example, the utility belt of a service technician (not shown). In a further aspect, a redundant release system 70 can be operatively associated with the connection portion 66B of the strap 66. In one example aspect, the redundant release system 70 can include at least one device such as button 70A, for example, threadedly attached to a portion of the strap 66 by means of one or more threads (comprised of cloth, nylon, or another suitable thread material) extending through one or more holes of the button 70A for enabling attachment of the button 70A to the portion of the strap 66. In another aspect, the threaded attachment of the button 70A to the strap 66 is structured for detachment upon application of a predetermined amount of force to the support system 62; which force may applied, in one example situation, as a downward force applied to an object or objects supported by the support system 62. It can be seen that the redundant release system 70, in one aspect, can be configured and provided to serve as a backup system for the normal operation of the coil spring portion 64A of the wire carrier 64. The redundant release system 70 may promote release of the support system 62 from the utility belt of a service technician, for example, in the event of an unexpected and/or undesirable level of force exerted on an object or objects supported by the wire carrier 64, for example.

Referring now to FIG. 5, in other embodiments of the present embodiments, multiple sizes, configurations and/or structures of one or more wire carriers can be provided for use in collective operative association for work performed on an elevated structure, for example. As shown, in one aspect, a first wire carrier 102 is provided with a coil spring portion 104 having a diameter 106. In another aspect, a second wire carrier 112 is provided with a coil spring portion 114 having a diameter 116. In another aspect, a third wire carrier 122 is provided with a coil spring portion 124 having a diameter 106. It can be appreciated that various aspects of the wire carriers 102, 112, 122 can be structured/configured in accordance with one or more aspects of the various wire carrier embodiments described hereinabove. For purposes of convenience and clarity of disclosure, discussion of various like elements of previously discussed wire carrier embodiments may or may not be repeated in the present discussion.

In various embodiments, each of the wire carriers 102, 112, 122 can be individually structured/dimensioned/configured for a particular type of supported object, such as, in one aspect, a particular type of wire, for example. It can be appreciated that one type of wire, for example, may have different characteristics than another type of wire, for example, with regard to the force exerted (e.g., such as may be determined by amount, weight, length, or another factor) when the wire is supported as a supported object in a selected one of the wire carriers 102, 112, 122. For example, one of the wire carriers 102, 112, 122 may be structured/dimensioned for use with telephone wire; another of the wire carriers 102, 112, 122 may be structured/dimensioned for use with fiber optic cable; another of the wire carriers 102, 112, 122 may be structured/dimensioned for use with electric wire, and so forth. In one aspect, the wire carriers 102, 112, 122 can be commonly connected, or otherwise commonly operatively associated with, the same object or structure. This common relationship between/among the wire carriers 102, 112, 122 is schematically represented in FIG. 5 by the connections 132, 134. It can be seen that this common connection or operative association may permit a service technician working on an elevated structure, for example, to perform multiple work functions more effectively and efficiently at a work site on the elevated structure.

It can be appreciated that choice of materials for construction/manufacture of the various structural elements disclosed herein is driven, at least in part, by the motivation to provide system and apparatus embodiments that are relatively lightweight, relatively compact, readily manipulated and structurally sound. It can be further appreciated that such materials can be selected to promote convenience of transportation and manipulation of the various aspects and components of the present embodiments in association with work performed on elevated structures, for example.

The examples presented herein are intended to illustrate potential implementations of the present method and system embodiments. It can be appreciated that such examples are intended primarily for purposes of illustration. No particular aspect or aspects of the example method and system embodiments described herein are intended to limit the scope of the present invention. The configuration and specific functions of a particular inflatable device, for example, are provided merely for convenience of disclosure.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. Because such elements are well known in the art, however, and because they do not facilitate a better understanding of the present invention, a discussion of such elements is not provided herein.

It can be appreciated that, in some embodiments of the present methods and systems disclosed herein, a single component can be replaced by multiple components, and multiple components replaced by a single component, to perform a given function. Except where such substitution would not be operative to practice the present methods and systems, such substitution is within the scope of the present invention.

Whereas particular embodiments of the invention have been described herein for the purpose of illustrating the invention and not for the purpose of limiting the same, it can be appreciated by those of ordinary skill in the art that numerous variations of the details, materials and arrangement of parts may be made within the principle and scope of the invention without departing from the invention as described in the appended claims.

What is claimed is:

1. A support system structured to support at least a portion of at least one supported object, said support system comprising:
    a wire carrier including:
        an elongated bar having a thickness having at least one coil spring portion formed therein having a diameter;
        a first arm having a proximate end connected to a first portion of said coil spring portion and a distal end;
        a second arm having a proximate end connected to a second portion of said coil spring portion and a distal end structured for contact with said distal end of said first arm;
        said coil spring portion being structured to resiliently bias said distal end of said first arm in contact with said distal end of said second arm for assisting with support of said supported object;
    a strap having an enclosure portion operatively associated with at least a portion of said coil spring portion of said wire carrier; and
    a redundant release system operatively associated with said strap, wherein said redundant release system includes at least one button threadedly attached to a portion of said strap.

2. The system of claim 1, wherein at least one of said distal end of said first arm of said wire carrier and said distal end of said second arm of said wire carrier includes a convex mating surface formed on at least a portion thereof.

3. The system of claim 1, wherein at least one of said distal end of said first arm of said wire carrier and said distal end of said second arm of said wire carrier includes a concave mating surface formed in at least a portion thereof.

4. The system of claim 1, wherein said supported object includes a quantity of wire.

5. The system of claim 1, wherein said threaded attachment of said button to said strap is structured for detachment upon application of a predetermined force to said redundant release system.

6. The system of claim 1, further comprising at least one additional coil spring portion formed in said elongated bar of said wire carrier.

7. The system of claim 1, wherein said coil spring portion of said wire carrier is configured as a function of at least a weight of said supported object for generating a force for said resilient bias.

* * * * *